US010460768B2

(12) United States Patent
Akagi et al.

(10) Patent No.: US 10,460,768 B2
(45) Date of Patent: *Oct. 29, 2019

(54) BASE UNIT AND DISK DRIVE APPARATUS

(71) Applicants: Nidec Corporation, Minami-ku, Kyoto (JP); Western Digital Technologies, Inc., San Jose, CA (US)

(72) Inventors: Masahiro Akagi, Kyoto (JP); Takeshi Ohiro, Kyoto (JP); Tomohiro Yoneda, Kyoto (JP); Akihiro Yudate, Kyoto (JP); Takayuki Ishino, Kyoto (JP); Sho Nakamura, Kyoto (JP); Jiro Kaneko, Yokohama (JP); Takako Hayakawa, Hiratsuka (JP); Kimihiko Sudo, Yokohama (JP); Yuta Onobu, Atsugi (JP)

(73) Assignees: NIDEC CORPORATION, Kyoto (JP); WEST DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/104,573

(22) Filed: Aug. 17, 2018

(65) Prior Publication Data

US 2019/0013049 A1 Jan. 10, 2019

Related U.S. Application Data

(63) Continuation of application No. 15/783,128, filed on Oct. 13, 2017, now Pat. No. 10,068,622, which is a
(Continued)

(30) Foreign Application Priority Data

Dec. 28, 2015 (JP) .................................. 2015-257080

(51) Int. Cl.
*G11B 33/14* (2006.01)
*G11B 33/02* (2006.01)
(Continued)

(52) U.S. Cl.
CPC ........ *G11B 33/1466* (2013.01); *G11B 25/043* (2013.01); *G11B 33/027* (2013.01); *G11B 33/122* (2013.01)

(58) Field of Classification Search
None
See application file for complete search history.

(56) References Cited

U.S. PATENT DOCUMENTS 6,822,048 B1 * 11/2004 Burmeister ............ C08G 18/69
428/355 BL
8,059,364 B1 * 11/2011 Andrikowich ..... G11B 33/1466
360/99.22
(Continued)

OTHER PUBLICATIONS

Akagi et al., "Base Unit and Disk Drive Apparatus", U.S. Appl. No. 15/783,128, filed Oct. 13, 2017.

*Primary Examiner* — William J Klimowicz
(74) *Attorney, Agent, or Firm* — Keating & Bennett, LLP

(57) ABSTRACT

A base member includes a recessed portion extending in radial directions and recessed upward from a lower surface of the base member, and a hole extending through the recessed portion in the vertical direction. The recessed portion includes a recessed portion loop-shaped surface defining a loop-shaped surface in the radial direction. A connector is located on a lower side of the recessed portion to cover the hole portion. An adhesive is located between the connector and the recessed portion. A minimum value of a gap distance in the radial direction between an outer end of the connector and an inner end of the recessed portion in which the outer end of the connector and the inner end of the recessed portion are opposed to each other with the adhesive
(Continued)

therebetween is greater than a minimum value of a gap in the vertical direction distance between an upper surface of the connector and the recessed portion loop-shaped surface, in which the upper surface of the connector and the recessed portion loop-shaped surface are opposed to each other with the adhesive therebetween. The adhesive includes a filler.

12 Claims, 7 Drawing Sheets

Related U.S. Application Data continuation of application No. 15/376,797, filed on Dec. 13, 2016, now Pat. No. 9,886,984.

(51) Int. Cl.
*G11B 33/12* (2006.01)
*G11B 25/04* (2006.01)

(56) References Cited

U.S. PATENT DOCUMENTS

| 9,886,984 B2* | 2/2018 | Akagi | G11B 33/027 |
| 10,068,622 B2* | 9/2018 | Akagi | G11B 33/027 |
| 2011/0211279 A1* | 9/2011 | Jacoby | G11B 25/043 |
| | | | 360/99.21 |
| 2017/0186467 A1* | 6/2017 | Akagi | G11B 33/027 |

* cited by examiner

BASE UNIT AND DISK DRIVE APPARATUS

CROSS REFERENCE TO RELATED APPLICATIONS

This application claims the benefit of priority to Japanese Patent Application No. 2015-257080 filed on Dec. 28, 2015. The entire contents of this application are hereby incorporated herein by reference.

Further, this application is a continuation of, and claims the benefit of the filing date of, U.S. patent application Ser. No. 15/783,128, filed Oct. 13, 2017, which is a continuation of and claims the benefit of the filing date of U.S. patent application Ser. No. 15/376,797, filed Dec. 13, 2016, now U.S. Pat. No. 9,886,984, each of which are incorporated herein by reference in their entirety.

BACKGROUND OF THE INVENTION

1. Field of the Invention

The present invention relates to a base unit for use in a disk drive apparatus.

2. Description of the Related Art

Disk drive apparatuses, such as, for example, hard disk drive (HDD) apparatuses, are often arranged to rotate disks at high speeds. In such an apparatus, each disk receives resistance caused by a gas enclosed in the apparatus, and this may cause a vibration of the disk and an error in reading or writing, an increase in a power consumption of a motor, or other problems. In particular, in recent years, the storage capacity of HDD apparatuses or the like has been increasing, and the number of disks has been increasing, and it has become important to take measures against the above problems.

Accordingly, instead of air, a gas (which may be hereinafter referred to as a low-density gas) having a density lower than that of air is sealed in a known disk drive apparatus to reduce the aforementioned resistance during rotation of the disk. As this low-density gas, helium or the like is used, for example.

In such a disk drive apparatus, it is important to improve the sealing in of the low-density gas. JP-A 2008-171482, for example, discloses a disk drive apparatus including a base and a cover, and having a low-density gas sealed in a housing space defined by the base and the cover fixed to each other.

In this disk drive apparatus, a feedthrough, which is a connector of one type, is joined to the base through a solder so as to close an opening defined in the base to prevent the low-density gas from leaking out of the base through the opening.

However, as noted in JP-A 2008-171482, a flange of the feedthrough and the base have different coefficients of thermal expansion, and therefore, an application of a stress to a solder joint with low stress resistance might cause a crack in the solder joint, resulting in a failure to sufficiently seal in the low-density gas.

It is thus conceivable to use an adhesive which is more resistant to heat shock than the solder and is also inexpensive as a material for joining the base and the connector to each other.

SUMMARY OF THE INVENTION

A base unit according to a preferred embodiment of the present invention is for use in a disk drive apparatus in which a gas with a density lower than that of air is sealed in a housing space defined by a base member and a cover fixed to each other. The base unit includes the base member that supports a motor rotatable about a central axis extending in a vertical direction, and a connector electrically connected to a wire in the housing space. The base member includes a recessed portion extending in radial directions and recessed upward from a lower surface of the base member, and a hole extending through the recessed portion in the vertical direction. The recessed portion includes a recessed portion loop-shaped surface defining a loop-shaped surface in the radial direction. The connector is located on a lower side of the recessed portion to cover the hole. An adhesive is located between the connector and the recessed portion. A minimum value of a gap distance in the radial direction between an outer end of the connector and an inner end of the recessed portion in which the outer end of the connector and the inner end of the recessed portion are opposed to each other with the adhesive therebetween is greater than a minimum value of a gap in the vertical direction distance between an upper surface of the connector and the recessed portion loop-shaped surface, in which the upper surface of the connector and the recessed portion loop-shaped surface are opposed to each other with the adhesive therebetween. The adhesive includes a filler, for example.

A base unit according to a preferred embodiment of the present invention is able to improve the sealing in of the low-density gas in a structure in which the connector is fixed to the base member through the adhesive.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary preferred embodiments of the present invention will be described with reference to the accompanying drawings. It is assumed herein that a direction in which a central axis about which a spindle motor is rotatable extends is referred to by the term "vertical direction", "vertical", or "vertically", and that directions perpendicular to the vertical direction and directions parallel to these directions are each referred to by the term "radial direction", "radial", or "radially". It is also assumed herein that a direction along a circular arc centered on the central axis is referred to by the term "circumferential direction", "circumferential", or "circumferentially". It is also assumed herein that the side on which a cover is arranged with respect to a base member is an upper side in the vertical direction. The shape of each member or portion and relative positions of different members or portions will be described based on the above assumptions. Note, however, that the above definitions of the vertical direction and the upper and lower sides are simply made for the sake of convenience in description, and should not be construed to restrict the orientation of a base unit or a disk drive apparatus according to any preferred embodiment of the present invention when in use.

Figure 1:
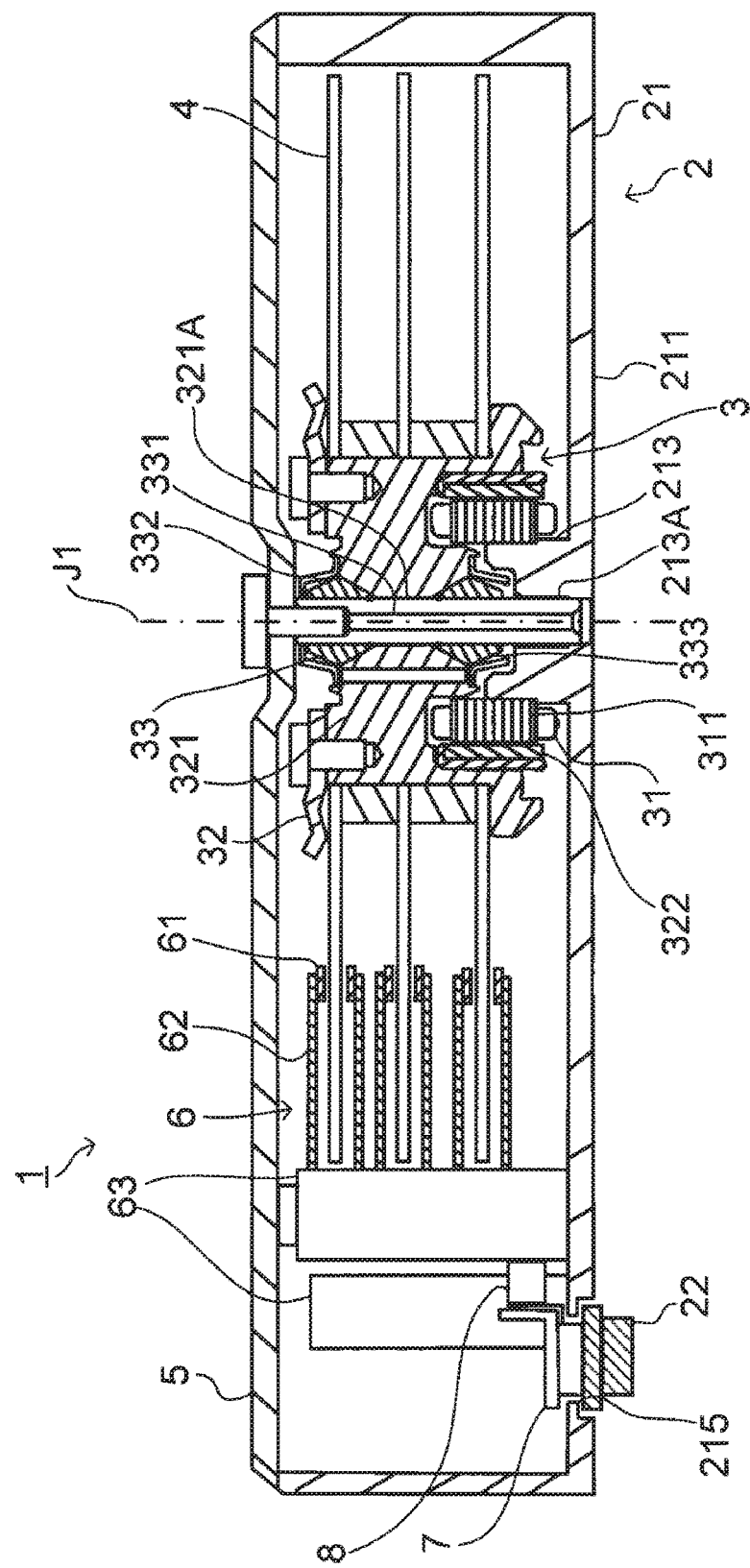
FIG. 1 is a vertical sectional view of a disk drive apparatus according to a preferred embodiment of the present invention.

FIG. 1 is a vertical sectional view of a disk drive apparatus 1 according to a preferred embodiment of the present invention. The upper side in FIG. 1 corresponds to the upper side in the vertical direction. The disk drive apparatus 1 is an apparatus arranged to perform reading and writing of information from or to magnetic disks 4 while rotating the magnetic disks 4. The disk drive apparatus 1 includes a base unit 2, a spindle motor 3, the magnetic disks 4, a cover 5, and an access portion 6.

The base unit 2 includes a base member 21 arranged to support the spindle motor 3, and a connector 22. The spindle motor 3 is capable of rotating about a central axis J1. The spindle motor 3 is arranged to rotate the magnetic disks 4, which are three in number, about the central axis J1 while supporting the magnetic disks 4. The spindle motor 3 and the access portion 6 are accommodated in a housing space of a case defined by the base member 21 and the cover 5. The access portion 6 is arranged to move heads 61 along recording surfaces of the magnetic disks 4 to perform the reading and the writing of information from or to the magnetic disks 4.

The cover 5 is joined and fixed to the base member 21 on the upper side of the base member 21. A junction of the base member 21 and the cover 5 is sealed by a sealant, such as an elastomer, or an adhesive, or through welding, for example. In addition, a gas having a density lower than that of air is sealed in the housing space of the case defined by the base member 21 and the cover 5. As the low-density gas, a helium gas, a nitrogen gas, a mixture of helium and nitrogen gases, or the like is preferably used. This contributes to reducing resistance applied to each magnetic disk 4, and thus to reducing vibrations of the magnetic disks 4 which occur during rotation, and minimizing an increase in a power consumption of the motor 3.

Note that the disk drive apparatus 1 may alternatively be arranged to include one, two, or more than three magnetic disks. Also note that the access portion 6 may alternatively be arranged to perform only one of the reading and the writing of information from or to the magnetic disks 4.

The spindle motor 3 includes a stator 31, a rotating portion 32, and a stationary portion 33. The stator 31 includes coils 311. The stator 31 is fixed to an outer circumference of a bearing fixing portion 213 of the base member 21. The bearing fixing portion 213 is arranged to project upward from a bottom portion 211 of the base member 21 to assume a substantially cylindrical shape.

The rotating portion 32 includes a rotor hub 321 and a rotor magnet 322. A shaft hole portion 321A extending in the vertical direction is defined in a center of the rotor hub 321. The rotor hub 321 is arranged to support the magnetic disks 4. The stationary portion 33 includes a shaft 331, a first cone portion 332, and a second cone portion 333. The shaft 331 is inserted through the shaft hole portion 321A of the rotor hub 321. The shaft 331 is inserted and fixed in an opening portion 213A defined inside of the bearing fixing portion 213, and is thus held while being oriented in the vertical direction along the central axis J1. Each of the first and second cone portions 332 and 333 is fixed to the shaft 331. While the spindle motor 3 is running, a fluid dynamic pressure is generated in a lubricating oil in a gap between the rotor hub 321 and each of the first and second cone portions 332 and 333. The rotor hub 321 is thus supported to be rotatable with respect to the shaft 331.

The access portion 6 includes the heads 61, arms 62, and a head actuator mechanism 63. Two of the heads 61 and two of the arms 62 are provided for each one of the magnetic disks 4. Each of the two arms 62 supports one of the heads 61. Each head is arranged to perform the reading and the writing of information while being arranged in close proximity to the corresponding magnetic disk 4. The head actuator mechanism 63 is arranged to actuate each of the arms 62 to move an associated one of the heads 61 relative to a corresponding one of the magnetic disks 4. The head 61 is thus arranged to make access to a desired location on the rotating magnetic disk 4 while being arranged in close proximity to the magnetic disk 4, to carry out the reading and the writing of information. Note that the head 61 may be arranged to perform at least one of the reading and the writing of information from or to the magnetic disk 4.

Figure 2:
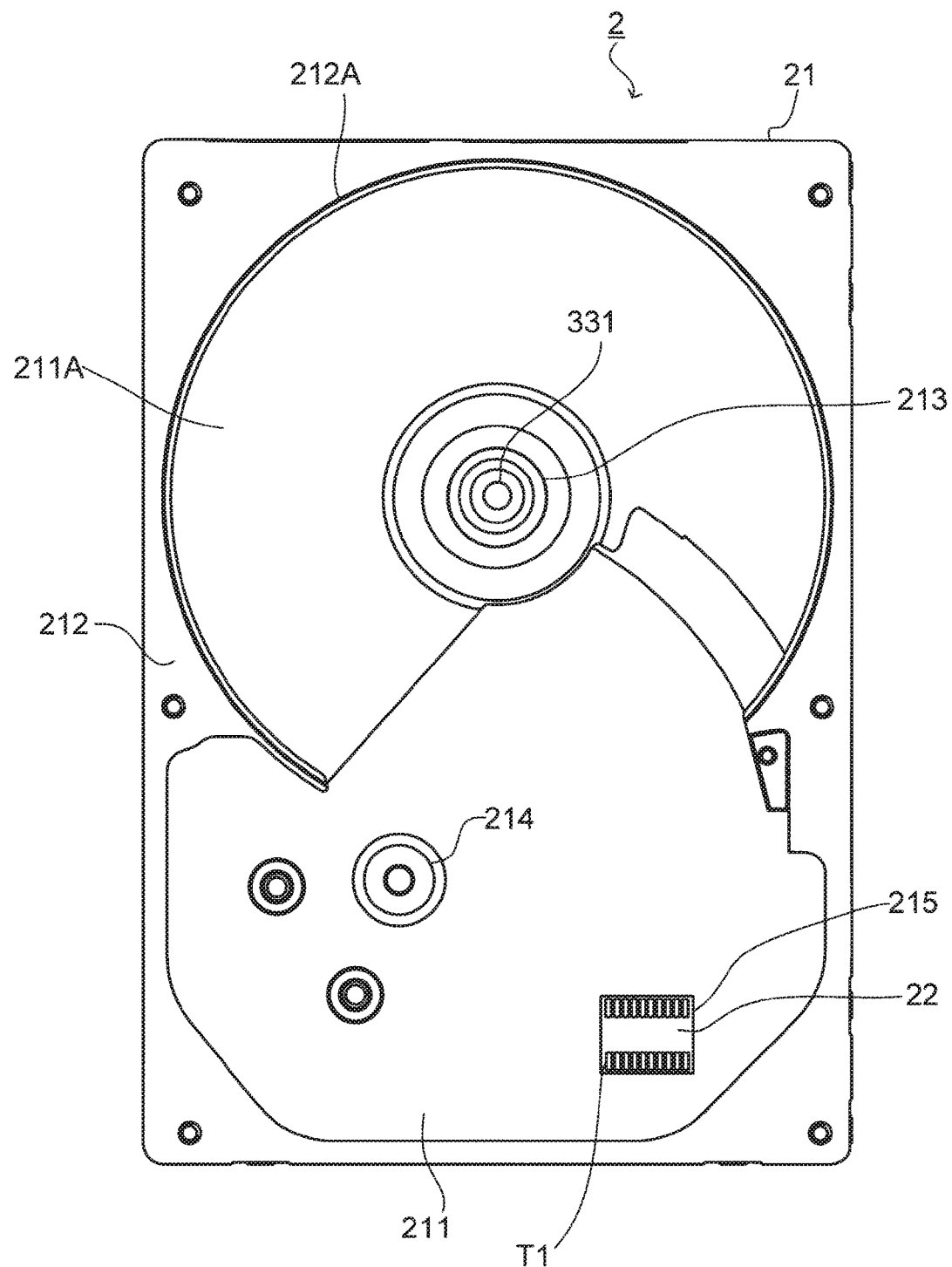
FIG. 2 is a top plan view of a base unit according to a preferred embodiment of the present invention.

FIG. 2 is a top plan view of the base unit 2. The base member 21 of the base unit 2 is a metal member made of, for example, aluminum. The bottom portion 211 and a side wall portion 212 of the base member 21 are molded by a die casting process as a single continuous monolithic member.

The side wall portion 212 includes a partially cylindrical side surface 212A. The partially cylindrical side surface 212A is a portion of an inside surface of the side wall portion 212. The partially cylindrical side surface 212A is a portion of a cylindrical surface centered on the central axis J1. The partially cylindrical side surface 212A is arranged opposite to an outer circumference of each magnetic disk 4, which is arranged inside of the partially cylindrical side surface 212A. The partially cylindrical side surface 212A is defined inside of the side wall portion 212 by a cutting process, and is coated with a coating agent through electrodeposition coating. Note that the above coating using the coating agent is not limited to the electrodeposition coating, but may alternatively be accomplished through spray coating or the like, for example. This is also true of coating of another portion which will be described below as being accomplished through electrodeposition coating.

The base member 21 includes the bottom portion 211. The bottom portion 211 includes a disk opposing bottom surface 211A. The disk opposing bottom surface 211A is a portion of an upper surface of the bottom portion 211. The disk opposing bottom surface 211A is a portion of a substantially annular surface centered on the central axis J1. The disk opposing bottom surface 211A is arranged opposite to a lower surface of the magnetic disk 4 arranged above. The disk opposing bottom surface 211A is defined by a cutting process after the die casting process, and is coated with a coating agent through electrodeposition coating.

The shaft 331 of the spindle motor 3 is fixed to the bearing fixing portion 213 as suggested above. The bearing fixing portion 213 is defined inside of the disk opposing bottom surface 211A by a cutting process.

After the die casting process, a head actuator mechanism fixing portion 214 is defined by a cutting process at a position away from the partially cylindrical side surface 212A and the disk opposing bottom surface 211A. The head actuator mechanism fixing portion 214 is arranged to project upward from the bottom portion 211. The head actuator mechanism fixing portion 214 is arranged to rotatably fix a portion of the head actuator mechanism 63.

Figure 3:
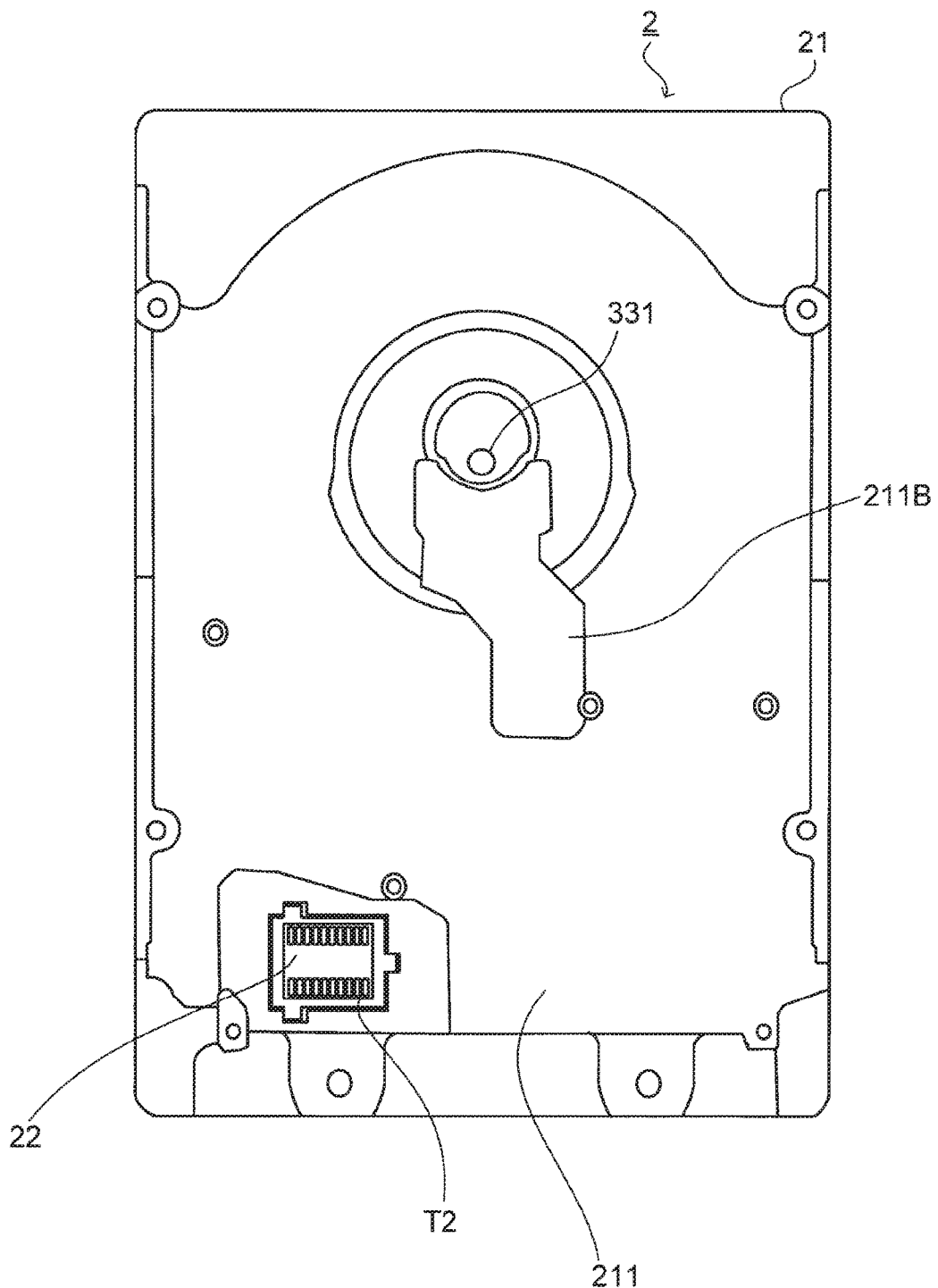
FIG. 3 is a bottom plan view of the base unit.

FIG. 3 is a bottom plan view of the base unit 2. An FPC mounting portion 211B is defined in a lower surface of the bottom portion 211. The FPC mounting portion 211B is a portion slightly recessed upward and on which a first FPC (a flexible printed circuit board), which is not shown, is mounted. The FPC mounting portion 211B is defined in the vicinity of the shaft 331 when viewed from below.

Here, a control circuit board (not shown) is fixed to the lower surface of the bottom portion 211 on the lower side in FIG. 3. Various circuits are formed on the control circuit board. The control circuit board is electrically connected to one end portion of the first FPC mounted on the FPC mounting portion 211B. Lead wires extending from the coils 311 (see FIG. 1) included in the stator 31 are electrically connected to another end portion of the first FPC. This allows electric currents to be supplied from a drive circuit formed on the control circuit board to the coils 311 through the first FPC to drive the spindle motor 3 to rotate.

In addition, a hole portion 215 (see FIG. 2) passing through the bottom portion 211 in the vertical direction is defined in the bottom portion 211 at a position away from the head actuator mechanism fixing portion 214. The connector 22, which is defined by a feedthrough, is fixed to the lower surface of the bottom portion 211 through an adhesive. In the situation in which the connector 22 is thus fixed, terminals T1 arranged in an upper surface of the connector 22 are exposed upwardly through the hole portion 215. Terminals T2 (see FIG. 3) each of which corresponds to a separate one of the terminals T1 are arranged in a lower surface of the connector 22. The control circuit board is arranged to cover the lower surface of the connector 22, and is electrically connected to each terminal T2.

Here, as illustrated in FIG. 1, the disk drive apparatus 1 includes an FPC connector 7 and a second FPC 8. The FPC connector 7 is arranged on the upper side of the bottom portion 21. A portion of the FPC connector 7 is passed through the hole portion 215 to be electrically connected to each terminal T1. The FPC connector 7 is electrically connected to one end portion of the second FPC 8. Another end portion of the second FPC 8 is electrically connected to the head actuator mechanism 63.

This enables a signal read by any of the heads 61 to be transmitted from the head actuator mechanism 63 to the control circuit board through the second FPC 8, the FPC connector 7, and the connector 22, and also enables a signal to be written by any of the heads 61 to be transmitted from the control circuit board to the head actuator mechanism 63 through the connector 22, the FPC connector 7, and the second FPC 8. It is also made possible to transmit a drive signal from the drive circuit formed on the control circuit board to a voice coil motor (not shown) included in the head actuator mechanism 63 through the connector 22, the FPC connector 7, and the second FPC 8.

Figure 4:
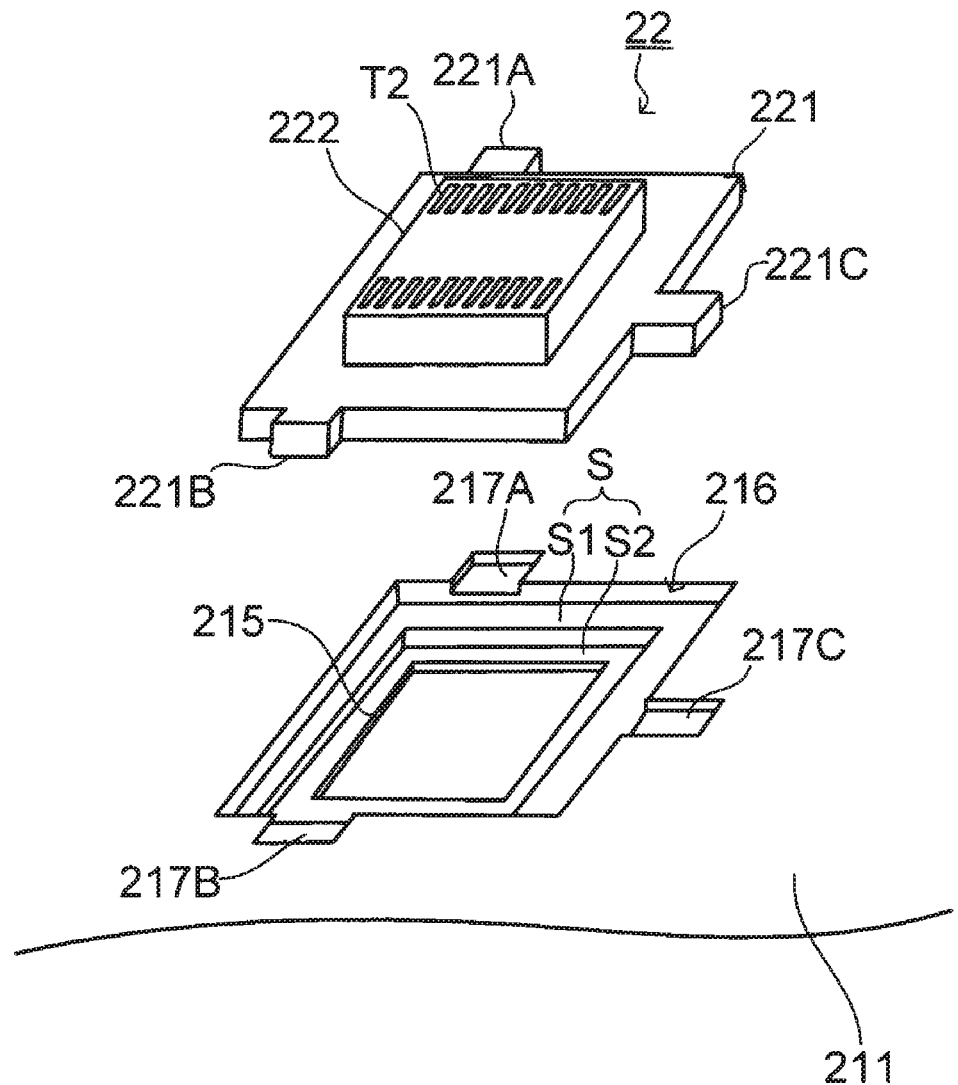
FIG. 4 is an exploded perspective view of an airtight structure realized by a connector, illustrating a base member as viewed from below, according to a preferred embodiment of the present invention.

Next, an airtight structure realized by the connector 22, which is defined by the feedthrough, to seal in the low-density gas will now be described in detail below. FIG. 4 is an exploded perspective view of the airtight structure realized by the connector 22, illustrating the base member 21 as viewed from below. That is, the lower side in FIG. 4 corresponds to the upper side.

The bottom portion 211 of the base member 21 includes a recessed portion 216 which extends in radial directions and is recessed upward from the lower surface of the bottom portion 211. The recessed portion 216 includes a recessed portion loop-shaped surface S, which is a loop-shaped surface perpendicular to the vertical direction. The recessed portion 216 is recessed in two steps from the lower surface of the bottom portion 211. Accordingly, the recessed portion loop-shaped surface S includes a first recessed portion loop-shaped surface S1, which is defined by a first-step recess, and a second recessed portion loop-shaped surface S2, which is defined by a second-step recess.

The hole portion 215, which passes through an area enclosed by the second recessed portion loop-shaped surface S2 in the vertical direction, is defined in the bottom portion 211. In other words, the base member 21 includes the hole portion 215 passing through the recessed portion 216 in the vertical direction. The second recessed portion loop-shaped surface S2 is arranged on the side of the first recessed portion loop-shaped surface S1 closer to the hole portion 215.

The bottom portion 211 includes collar portions 217A, 217B, and 217C each of which is recessed upward and projects in a radial direction from an outer circumference of the recessed portion 216. The collar portions 217A and 217B are arranged to project from opposed sides of an outer peripheral edge of the recessed portion 216. The collar portion 217C is arranged to project from a side that joins the above opposed sides. The extent to which each of the collar portions 217A to 217C is recessed is smaller than the extent to which the first recessed portion loop-shaped surface S1 is recessed in the recessed portion 216.

The connector 22 includes a plate-shaped base portion 221 and a body portion 222 arranged to project downward from the base portion 221. The terminals T2 are arranged in a lower surface of the body portion 222. The terminals T1 (see FIG. 2), which are not shown in FIG. 4, are arranged in an upper surface of the base portion 221. The base portion 221 includes projecting portions 221A, 221B, and 221C each of which is arranged to project in a radial direction from an outer circumference thereof. The projecting portions 221A, 221B, and 221C correspond to the collar portions 217A, 217B, and 217C, respectively. Although, in the present preferred embodiment, the collar portions 217A to 217C are arranged at three positions, and the projecting portions 221A to 221C are arranged at three corresponding positions, this is not essential to the present invention. For example, only two collar portions parallel to each other and only two projecting portions parallel to each other may be arranged, and also, collar portions and projecting portions may both be arranged at more than three positions.

A method by which the connector 22 is fixed to the base member 21 will now be described below. Note that, when the connector 22 is fixed thereto, a lower surface of the base member 21 is arranged to face in a direction opposite to the direction of gravity (that is, the direction of gravity points downward in FIG. 4). An adhesive is applied onto the first recessed portion loop-shaped surface S1 such that the adhesive will extend all the way around the hole portion 215. As this adhesive, an anaerobic adhesive, for example, is used. With the adhesive applied on the first recessed portion loop-shaped surface S1, the projecting portions 221A to 221C of the connector 22 are pressed against upper surfaces of the collar portions 217A to 217C, respectively. The connector 22 is thus arranged on the lower side of the recessed portion 216 to cover the hole portion 215. The adhesive intervenes between the connector 22 and the recessed portion 216. The projecting portions 221A to 221C are arranged in the collar portions 217A to 217C, respectively. As a result of the adhesive being cured, the connector 22 is fixed to the base member 21. The adhesive preferably includes at least one of a glass bead and a metal filler to achieve an improvement in the sealing in of the low-density gas.

Figure 5:
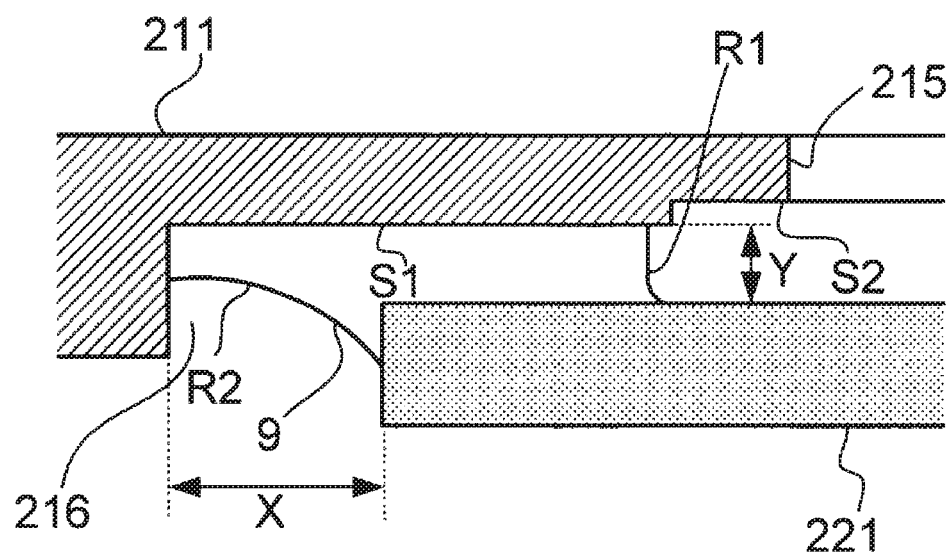
FIG. 5 is a side sectional view of the connector and a bottom portion fixed to each other taken along a line that does not pass through any collar portion according to a preferred embodiment of the present invention.

FIG. 5 is a side sectional view of the connector 22 and the bottom portion 211 fixed to each other taken along a line that does not pass through any of the collar portions 217A to 217C. As illustrated in FIG. 5, an adhesive 9 is arranged between the base portion 221 of the connector 22 and the recessed portion 216. The adhesive 9 intervenes between an outer end of the base portion 221 and an inner end of the recessed portion 216 and between the upper surface of the base portion 221 and the first recessed portion loop-shaped surface S1.

A minimum value of a gap distance X between the outer end of the base portion 221 and the inner end of the recessed portion 216 in a radial direction in which the outer end of the base portion 221 and the inner end of the recessed portion 216 are opposed to each other with the adhesive 9 therebetween is greater than a minimum value of a gap distance Y between the upper surface of the base portion 221 and the first recessed portion loop-shaped surface S1 in the vertical direction, in which the upper surface of the base portion 221 and the first recessed portion loop-shaped surface S1 are opposed to each other with the adhesive 9 therebetween.

Figure 7:
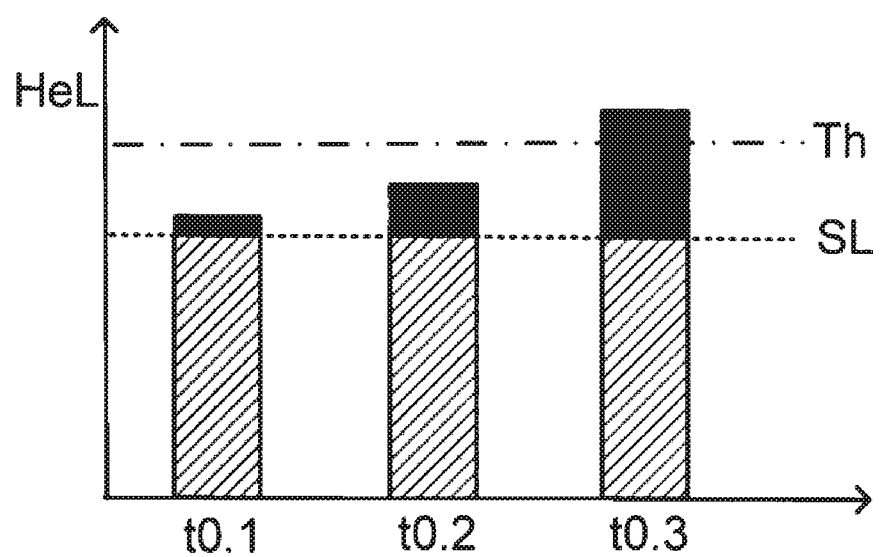
FIG. 7 is a graph illustrating example relationships between a gap distance between the connector and the base member and the amount of a leakage of sealed-in helium.

Here, FIG. 7 is a graph illustrating example relationships between the gap distance between the connector and the base member and the amount of a leakage of sealed-in helium (which is an example of the low-density gas). The horizontal axis in FIG. 7 represents minimum values (which are 0.1 mm, 0.2 mm, and 0.3 mm) of the gap distance between the connector and the base member. The vertical axis in FIG. 7 represents the amount of the leakage of helium sealed in the housing space defined by the base member and the cover.

Hatched areas in FIG. 7 represent the amount of a leakage due to a cause other than the gap (for example, a leakage through the connector itself, a leakage due to a hole through which a coil wire of the motor is drawn out, or the like). In the case where the connector is fixed to the base member through a solder, the solder is arranged in the gap. As illustrated in FIG. 7, the amount SL of a leakage of helium in this case does not depend on the gap distance, but corresponds to an amount represented by each hatched area. That is, in the case where the connector is fixed to the base member through the solder, the amount of the leakage of helium through the gap is substantially zero regardless of the size of the gap.

In contrast, in the case where the connector is fixed through an adhesive, the adhesive is arranged in the gap. The amount of a leakage of helium through the gap in this case is represented by a black area in FIG. 7. That is, the sum total of the amount of the leakage represented by the hatched area and the amount of the leakage represented by the black area corresponds to the total amount of the leakage of helium. As illustrated in FIG. 7, the amount of the leakage through the gap as represented by the black area decreases as the gap distance decreases. Thus, when the gap distance has a large value, 0.3 mm, the total amount of the leakage of helium exceeds a tolerance threshold value Th. Then, when the gap distance is reduced to 0.2 mm and 0.1 mm, the total amount of the leakage is below the tolerance threshold value Th. Therefore, when the minimum value of the gap distance between the connector and the base member is arranged to be 0.2 mm or less, the total amount of the leakage of helium does not exceed the tolerance threshold value Th. Adjustment of the gap distance is important when not a solder but an adhesive is used to fix the connector.

As described above, in the present preferred embodiment, the minimum value of the gap distance X as illustrated in FIG. 5 is arranged to be greater than the minimum value of the gap distance Y, and therefore, a narrow gap having the gap distance Y can be defined, and the adhesive 9 can be forced into this gap by capillary action. The minimum value of the gap distance X is arranged to be, for example, 0.5 mm, and the minimum value of the gap distance Y is arranged to be, for example, 0.2 mm or less. This contributes to effectively preventing the low-density gas sealed in the housing space defined by the base member 21 and the cover 5 from leaking out through the hole portion 215 and the gap having the gap distance Y.

Further, because the adhesive 9 is actively forced toward the upper side of the base member 21 by capillary action, the likelihood that the adhesive 9 will leak out to the lower side of the base member 21 is reduced. This in turn reduces the likelihood that a portion of the adhesive 9 will leak out to be attached to the control circuit board, causing a failure of the spindle motor 3 to rotate or another malfunction.

Furthermore, the adhesive 9, which is pressed by the connector 22 at the time of the adhesion of the connector 22, travels longer distances in narrower gaps. Therefore, the adhesive can be actively forced into the narrow gap having the gap distance Y, which is defined in the present preferred embodiment.

Although, in FIG. 5, a surface R1 of the adhesive 9 on the side closer to the hole portion 215 is defined between the upper surface of the base portion 221 and the first recessed portion loop-shaped surface S1, the surface R1 may alternatively be defined between the upper surface of the base portion 221 and the second recessed portion loop-shaped surface S2. This allows the adhesive 9 to be more actively forced toward the upper side of the base member 21.

A portion of a surface R2 of the adhesive 9 on the side opposite to the side closer to the hole portion 215 is defined between the upper surface of the base portion 221 and the first recessed portion loop-shaped surface S1. At the time of the adhesion of the connector 22, the adhesive 9 does not easily travel in the wider gap having the gap distance X, and the adhesive 9 can be actively forced into the narrower gap having the gap distance Y.

The recessed portion loop-shaped surface S is arranged to have a degree of surface roughness greater than the degree of surface roughness of the upper surface of the base portion 221. This contributes to preventing the adhesive 9 from leaking out to the upper side of the base member 21 through the hole portion 215 after traveling along the recessed portion loop-shaped surface S.

Each of the outer end of the base portion 221 and the inner end of the recessed portion 216 is arranged to have a degree of surface roughness greater than the degree of surface roughness of the upper surface of the base portion 221. This contributes to preventing the adhesive 9 from leaking out to the lower side of the base member 21 to be attached to the control circuit board or the like.

Figure 6:
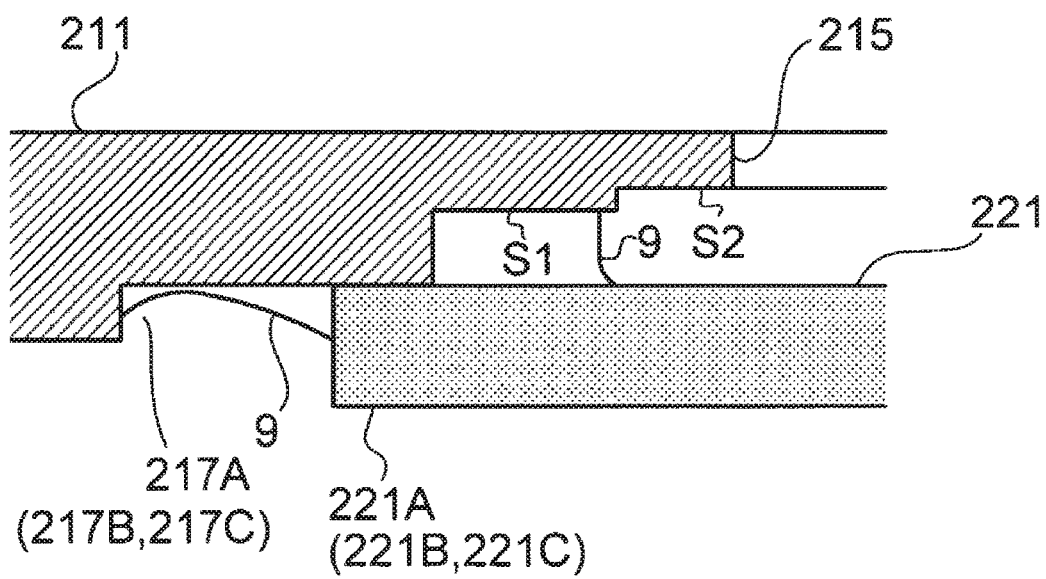
FIG. 6 is a side sectional view of the connector and the bottom portion fixed to each other taken along a line that passes through any collar portion according to a preferred embodiment of the present invention.

FIG. 6 is a side sectional view of the connector 22 and the bottom portion 211 fixed to each other taken along a line that passes through any of the collar portions 217A to 217C. In the following description, the collar portion 217A is chosen as a representative for the sake of convenience. As illustrated in FIG. 6, at the time of the adhesion of the connector 22, the adhesive 9 is pressed by the base portion 221, and an upper surface of the projecting portion 221A is pressed against an upper surface of the collar portion 217A. This easily achieves the positioning of the connector 22 in the vertical direction.

As a result, the adhesive 9 intervenes between the upper surface of the base portion 221 and the first recessed portion loop-shaped surface S1, and between an outer end of the projecting portion 221A and an inner end of the collar portion 217A. In addition, the adhesive 9 also intervenes in a very narrow gap between the upper surface of the projecting portion 221A and the upper surface of the collar portion 217A.

While preferred embodiments of the present invention have been described above, the preferred embodiments may be modified in various manners without departing from the scope and spirit of the present invention.

For example, the connector used to seal in the low-density gas is not limited to the feedthrough as described above, but may alternatively be a connector defined by a low temperature co-fired ceramic (LTCC).

Also note that an additional first-step recess having a loop-shaped surface arranged at a level lower than that of the first recessed portion loop-shaped surface S1 according to the above-described preferred embodiment may be defined all the way around the hole portion 215. In this case, the recessed portion includes three recessed portion loop-shaped surfaces. In this case, the base portion of the connector is not provided with the projecting portions, and an outer edge portion of the base portion is pressed against the loop-shaped surface of the above recess all the way around the hole portion 215 to accomplish the adhesion of the connector.

Preferred embodiments of the present invention are applicable to disk drive apparatuses, such as, for example, HDDs.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A base unit for use in a disk drive apparatus in which a gas with a density lower than that of air is sealed in a housing space defined by a base member and a cover fixed to each other, the base unit comprising:
    the base member that supports a motor rotatable about a central axis extending in a vertical direction; and
    a connector electrically connected to a wire in the housing space; wherein the base member includes:
        a recessed portion extending in radial directions and recessed upward from a lower surface of the base member; and
        a hole extending through the recessed portion in the vertical direction;
    the recessed portion includes a recessed portion loop-shaped surface defining a loop-shaped surface in the radial direction;
    the connector is located on a lower side of the recessed portion to cover the hole;
    an adhesive is located between the connector and the recessed portion; and
    a minimum value of a gap distance in the radial direction between an outer end of the connector and an inner end of the recessed portion in which the outer end of the connector and the inner end of the recessed portion are opposed to each other with the adhesive therebetween is greater than a minimum value of a gap in the vertical direction distance between an upper surface of the connector and the recessed portion loop-shaped surface, in which the upper surface of the connector and the recessed portion loop-shaped surface are opposed to each other with the adhesive therebetween; wherein
    the adhesive includes a filler; and
    the adhesive extends all the way around the hole.

2. The base unit according to claim 1, wherein a surface of the adhesive on a side closer to the hole is defined between the upper surface of the connector and the recessed portion loop-shaped surface.

3. The base unit according to claim 2, wherein
    the recessed portion loop-shaped surface includes a first recessed portion loop-shaped surface, and a second recessed portion loop-shaped surface on a side of the first recessed portion loop-shaped surface closer to the hole; and
    the surface of the adhesive is defined at the second recessed portion loop-shaped surface.

4. The base unit according to claim 1, wherein at least a portion of a surface of the adhesive on a side opposite to a side closer to the hole is defined between the upper surface of the connector and the recessed portion loop-shaped surface.

5. The base unit according to claim 1, wherein
    the base member includes a collar portion recessed upward and projecting in a radial direction from an outer circumference of the recessed portion;
    an extent to which the collar portion is recessed is less than an extent to which the recessed portion loop-shaped surface is recessed in the recessed portion; and
    the connector includes a projecting portion projecting in the radial direction from an outer circumference thereof to be located in the collar portion.

6. The base unit according to claim 5, wherein the projecting portion of the connector corresponds to the collar portion of the base member.

7. The base unit according to claim 1, wherein the recessed portion loop-shaped surface has a degree of surface roughness greater than a degree of surface roughness of the upper surface of the connector.

8. The base unit according to claim 1, wherein each of the outer end of the connector and the inner end of the recessed portion has a degree of surface roughness greater than a degree of surface roughness of the upper surface of the connector.

9. The base unit according to claim 1, wherein the filler includes a glass bead.

10. The base unit according to claim 1, wherein the filler includes a metal.

11. The base unit according to claim 1, wherein the filler includes a glass bead and a metal.

12. A disk drive apparatus comprising:
    the base unit of claim 1;
    the cover;
    the motor; and
    an access portion that performs at least one of reading and writing of information from or to a disk supported by the motor; wherein the motor and the access portion are accommodated in the housing space.

\* \* \* \* \*